(12) United States Patent
Chen et al.

(10) Patent No.: US 10,984,783 B2
(45) Date of Patent: Apr. 20, 2021

(54) SPOKEN KEYWORD DETECTION BASED UTTERANCE-LEVEL WAKE ON INTENT SYSTEM

(71) Applicant: Intel Corporation, Santa Clara, CA (US)

(72) Inventors: Wenda Chen, Singapore (CN); Jonathan Huang, Pleasanton, CA (US); Tobias Bocklet, Munich (DE); Munir Georges, Kehl (DE)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 16/366,757

(22) Filed: Mar. 27, 2019

(65) Prior Publication Data

US 2019/0221206 A1    Jul. 18, 2019

(51) Int. Cl.
  *G10L 15/22*  (2006.01)
  *G10L 15/18*  (2013.01)
  *G06F 3/16*   (2006.01)
  *G10L 15/08*  (2006.01)

(52) U.S. Cl.
  CPC .......... *G10L 15/1822* (2013.01); *G06F 3/167* (2013.01); *G10L 15/22* (2013.01); *G10L 2015/088* (2013.01); *G10L 2015/223* (2013.01)

(58) Field of Classification Search
  CPC .......................... G10L 15/22; G10L 2015/088
  See application file for complete search history.

(56) References Cited

U.S. PATENT DOCUMENTS

| | | | |
|---|---|---|---|
| 10,127,908 B1 * | 11/2018 | Deller | G10L 15/26 |
| 2009/0204410 A1 * | 8/2009 | Mozer | G10L 15/30 |
| | | | 704/275 |
| 2015/0154954 A1 * | 6/2015 | Sharifi | G10L 15/1815 |
| | | | 704/251 |
| 2017/0372199 A1 * | 12/2017 | Hakkani-Tur | G06N 3/08 |
| 2018/0232662 A1 * | 8/2018 | Solomon | G06F 3/167 |
| 2019/0013019 A1 * | 1/2019 | Lawrence | G06F 3/167 |
| 2019/0043527 A1 * | 2/2019 | Georges | G10L 15/22 |

OTHER PUBLICATIONS

GLoVe: Global Vectors for Word Representation; available online via: https://nlp.stanford.edu/projects/glove; accessed Mar. 27, 2019.
Phoible 2.0; Moran, Steven & McCloy, Daniel (eds.) 2019; Jena: Max Planck Institute for Science of Human History (available online at http://phoible.org, accessed on Mar. 27, 2019).

(Continued)

*Primary Examiner* — Jialong He
(74) *Attorney, Agent, or Firm* — Green, Howard & Mughal LLP.

(57) ABSTRACT

An embodiment of a wake-on-intent speech recognition device includes technology to detect one or more keywords in a digital representation of a spoken natural language utterance, determine an intent of the spoken natural language utterance based on the detected keywords, and provide the spoken natural language utterance to a speech recognition and interpretation system if the determined intent is to further process the spoken natural language utterance. Other embodiments are disclosed and claimed.

15 Claims, 9 Drawing Sheets

(56) References Cited

OTHER PUBLICATIONS

Al-Hashemi, R.,"Text summarization extraction system (tses) using extracted keywords", Int. Arab J. e-Technol., vol. 1, No. 4, pp. 164-168, 2010.
Chung, et al., "Speech2vec: A sequence-to-sequence framework for learning word embeddings from speech", CoRR, vol. abs/1803.08976, 2018.
Mandal, A. et al., "Recent developments in spoken term detection: a survey", International Journal of Speech Technology, vol. 17, No. 2, pp. 183-198, 2014.
Sherry, J. et al., "Getting things done in an autonomous vehicle", Workshop at the 13th Annual ACM/IEEE International Conference on Human-Robot Interaction (HRI), 2018.
Tur, G. et al., "Intent determination and spoken utterance classification", Spoken Language Understanding: Systems for Extracting Semantic Information from Speech; pp. 93-118, 2011.

* cited by examiner

SPOKEN KEYWORD DETECTION BASED UTTERANCE-LEVEL WAKE ON INTENT SYSTEM

BACKGROUND

Automatic speech recognition (ASR) systems may be found in many devices and environments including home, work, and vehicles. Some ASR systems include wake on keyphrase technology. For example, AMAZON products may utilize the phrase "ALEXA," GOOGLE products may utilize the phrase "OK, GOOGLE," APPLE products may utilize the phrase "HEY SIRI." A suitably configured device in the local environment may listen for the keyphrase and when the keyphrase is detected the spoken request may be sent along for further processing.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
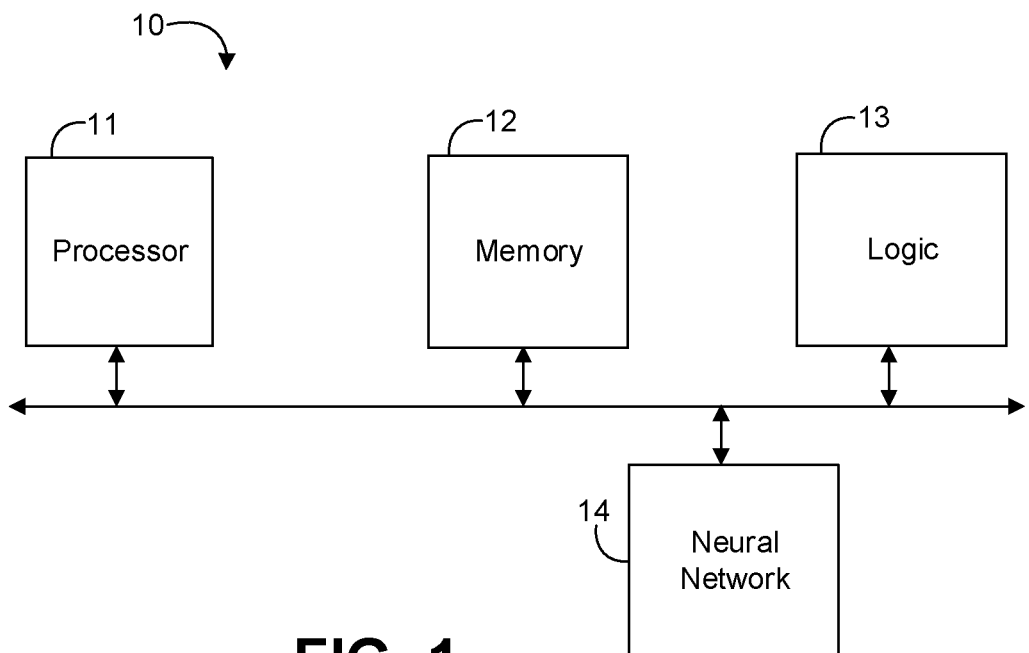
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to speech recognition systems. More particularly, some embodiments relate to a spoken keyword detection based utterance-level wake on intent system.

With reference to FIG. 1, an embodiment of an electronic system 10 may include memory 12 to store a digital representation of a spoken natural language utterance, a processor 11 coupled to the memory 12, and logic 13 coupled to the processor 11 and the memory 12. The logic 13 may be configured to detect one or more keywords in the stored representation of the spoken natural language utterance, determine an intent of the spoken natural language utterance based on the detected keywords, and provide the spoken natural language utterance to a speech recognition and interpretation system (e.g., including natural language understanding (NLU), natural language interpretation (NLI), natural language processing (NLP), etc.) if the determined intent is to further process the spoken natural language utterance. By way of illustration and not limitation, a spoken natural language utterance refers to regular conversational speech as opposed to a non-natural utterance where the speech is required to include some artificial or nominal keyphrase. In some embodiments, the logic 13 may be configured to determine the intent based on a sequence of detected non-keyphrase keywords in the spoken natural language utterance. For example, the logic 13 may be configured to trigger the speech recognition and interpretation system prior to identification of an end of the spoken natural language utterance based on the sequence of detected non-keyphrase keywords.

In some embodiments, the logic 13 may be further configured to classify the intent into one of three or more intent classifications based on detected keywords which are relevant to the intent. For example, the system 10 may further include a neural network 14 trained with an intent classification model communicatively coupled to the logic 13 to classify the intent based on keyword speech information, keyword text information, and end of utterance information.

For example, the keyword speech information may include one or more of phoneme information and acoustic spectrogram information. In some embodiments, the logic 13 may be further configured to segment a detected keyword sequence from the spoken natural language utterance, and convert speech words from the segmented keywords to a corresponding Mel-Scale Frequency Cepstral Coefficients (MFCC) feature vector sequence, a phoneme level sequence, and word level vectors that represent the detected keyword sequence.

Embodiments of each of the above processor 11, memory 12, logic 13, neural network 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a graphic processor, a controller, a microcontroller, etc.

In some embodiments, the memory 12, the logic 13, and/or the neural network 14 may be located in, or co-located with, various components, including the processor 11 (e.g., on a same die). For example, the logic 13 may be implemented on a semiconductor apparatus which may include one or more substrates, with the logic 13 coupled to the one or more substrates. In some embodiments, the logic 13 may be at least partly implemented in one or more of configurable logic and fixed-functionality hardware logic on semiconductor substrate(s) (e.g., silicon, sapphire, gallium-arsenide, etc.). For example, the logic 13 may include a transistor array and/or other integrated circuit components coupled to the substrate(s) with transistor channel regions that are positioned within the substrate(s). The interface between the logic 13 and the substrate(s) may not be an abrupt junction. The logic 13 may also be considered to include an epitaxial layer that is grown on an initial wafer of the substrate(s).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, detecting the keywords in the digital representation of the spoken natural language utterance, determining the intent, transmitting the spoken natural language utterance to the speech recognition and interpretation system, etc.).

Figure 2A:
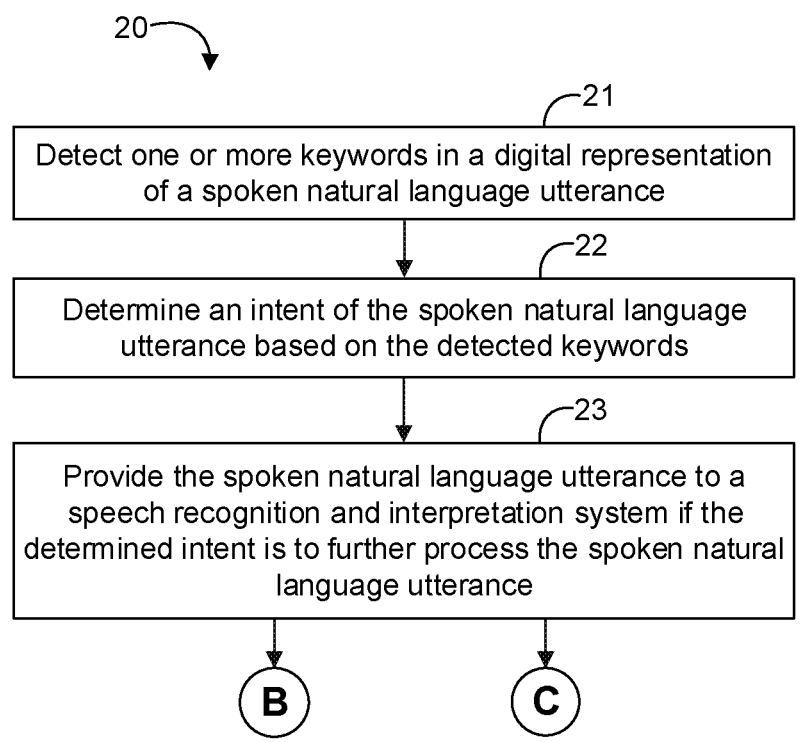
FIGS. 2A to 2C are flowcharts of an example of a method of waking on intent according to an embodiment.
Figure 2B:
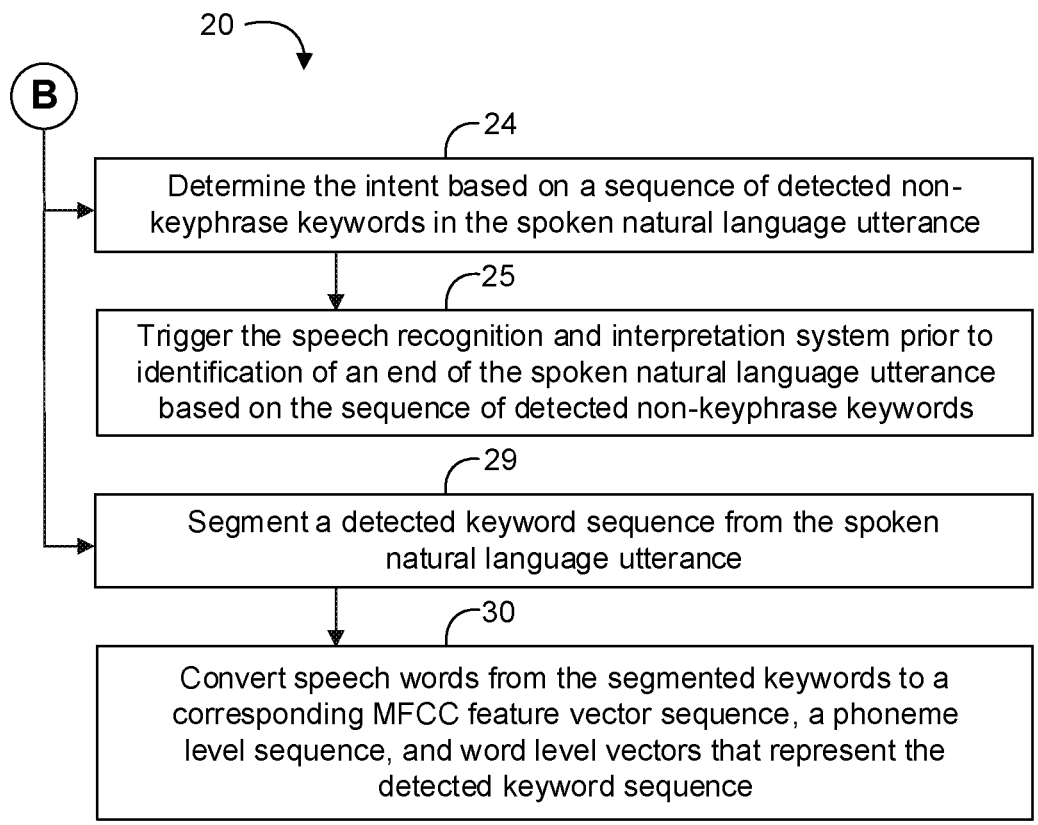
Figure 2C:
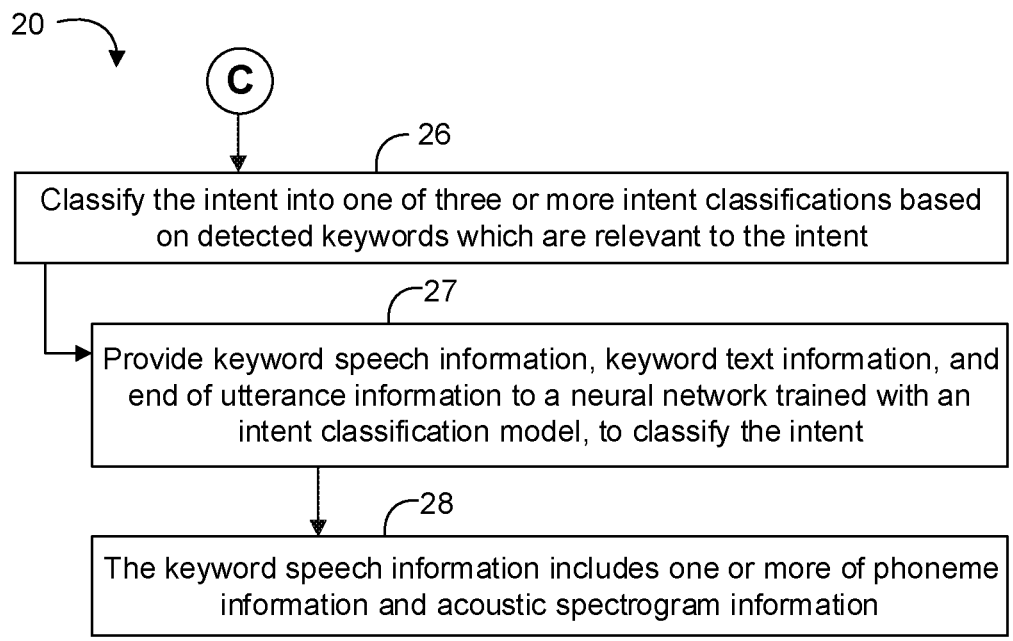

Turning now to FIGS. 2A to 2C, an embodiment of a method 20 of waking on intent may include detecting one or more keywords in a digital representation of a spoken natural language utterance at block 21, determining an intent of the spoken natural language utterance based on the detected keywords at block 22, and providing the spoken natural language utterance to a speech recognition and interpretation system if the determined intent is to further process the spoken natural language utterance at block 23. Some embodiments of the method 20 may include determining the intent based on a sequence of detected non-keyphrase keywords in the spoken natural language utterance at block 24. For example, the method 20 may further include triggering the speech recognition and interpretation system prior to identification of an end of the spoken natural language utterance based on the sequence of detected non-keyphrase keywords at block 25.

Some embodiments of the method 20 may also include classifying the intent into one of three or more intent classifications based on detected keywords which are relevant to the intent at block 26. For example, the method 20 may include providing keyword speech information, keyword text information, and end of utterance information to a neural network trained with an intent classification model, to classify the intent, at block 27 (e.g., where the keyword speech information includes one or more of phoneme information and acoustic spectrogram information at block 28). Some embodiments of the method 20 may further include segmenting a detected keyword sequence from the spoken natural language utterance at block 29, and converting speech words from the segmented keywords to a corresponding MFCC feature vector sequence, a phoneme level sequence, and word level vectors that represent the detected keyword sequence at block 30.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 15 to 21 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide utterance-level wakeup on intent technology from speech keywords. For example, some embodiments may provide wake on intent (WOI) technology for platforms with limited compute and memory resources. Some other automatic speech recognition (ASR) systems may utilize wake on key-phrase technology which may focus on a single key phrase detection such as "ALEXA," "OK GOOGLE," "HEY SIRI," etc. From a user experience point of view, however, these systems are somewhat unnatural because they require the user to always say the key phrase. Some other always on ASR technology may continuously support a large vocabulary for ASR to determine intent. The heavy processing, network bandwidth, and memory requirements of such an always on, large vocabulary system may not be suitable for platforms with limited compute, network, and/or memory resources. Another problem is that full sentence level ASR for intent may not be sufficiently accurate in noisy domains. In some other systems, intent recognition is based on the text only and accordingly requires accurate spoken information retrieval and grammatically correct sentence construction. In applications of multi-modal scenarios and human-machine interactions, some embodiments may advantageously capture noisy keywords spoken by the user and may infer intent based on both text and speech information. Some embodiments may advantageously overcome the difficulty of not having clear intent rules from text semantics and may utilize machine learning technology for intent classification. Some embodiments may advantageously wake up on intent, so that the use of key phrase can be eliminated (or reduced, for example, to a backup in case WOI fails). Some embodiments may detect keywords relevant to the intent, and uses enhanced features to perform the final intent classification.

Some embodiments may provide utterance level intent classification based on a sequence of keywords in the utterance instead of a single fixed key phrase. In some embodiments, the keyword sequence is transformed into four types of input features including acoustics, phones, WORD2VEC, and SPEECH2VEC for individual intent learning followed by fused decision making. WORD2VEC refers to a group of related models that are used to produce word embeddings. SPEECH2VEC refers to a particular technology for unsupervised learning of word embeddings from speech. After the intent is detected, some embodiments may trigger the more power-costly automatic speech recognition (ASR) technology. As opposed to wake on key-phrase based technology, some embodiments may provide more detailed feature modeling procedures from the word level to the utterance level, which may advantageously provide noise robust intent classification in a variety of environments including, for example, vehicle cabin environments. Some embodiments of a wakeup on intent system may be implemented with low-power and low-complexity technology, which makes the system suitable for always on operation with suitable hardware (e.g., ultra-low power always listening products such as INTEL 7th Generation Processor Family cAVS (Audio, Voice, Speech)-A2E0 chipsets, INTEL GAUSSIAN MIXTURE MODELS AND NEURAL NETWORKS ACCELERATOR (GNA), etc.

Some embodiments may provide technology to use the keywords sequence in a speech utterance to determine the intent of the speaker. Instead of just using the syntactical sequence of spotted keywords for intent classification, some embodiments may use a feature representation which is closer to the speech signal. For example, some embodiments may include MFCC enhanced keyword features. Some embodiments may enable a low-power always-on system that focuses the analysis on relevant parts of an utterance.

Advantageously, some embodiments may be applied to the different application domains where an agent is waiting for an instruction from a user in an always-on mode. Running on suitable low power hardware, an implementation may be able to capture the core intent from the user while saving resources on battery power devices. Some embodiments may be particularly useful for artificial intelligence (AI) related fields for human-agent communication and understanding while the environment is a noisy room or inside a car. For example, 'intelligent' meetings, parties, and in-car environments may all benefit from active AI based human-computer interactions and all may further benefit from embodiments of an always-listening low-power intent recognition system.

Some embodiments may provide technology to detect a set of keywords in a sequence and make an intent decision from the detected keywords/sequence by using enhanced features. The number of keywords may depend on each utterance. For example, one to three keywords may be detected to determine an intent of the speaker to utilize an ASR system. An example of intent determination from three utterances is shown below:

"increase" + "speed" == faster;
"turning" + "way" == destination;
"slowing" + "down" == slower;
where <keyword_1> + <keyword_2> == <utterance_intent>.

Figure 3:
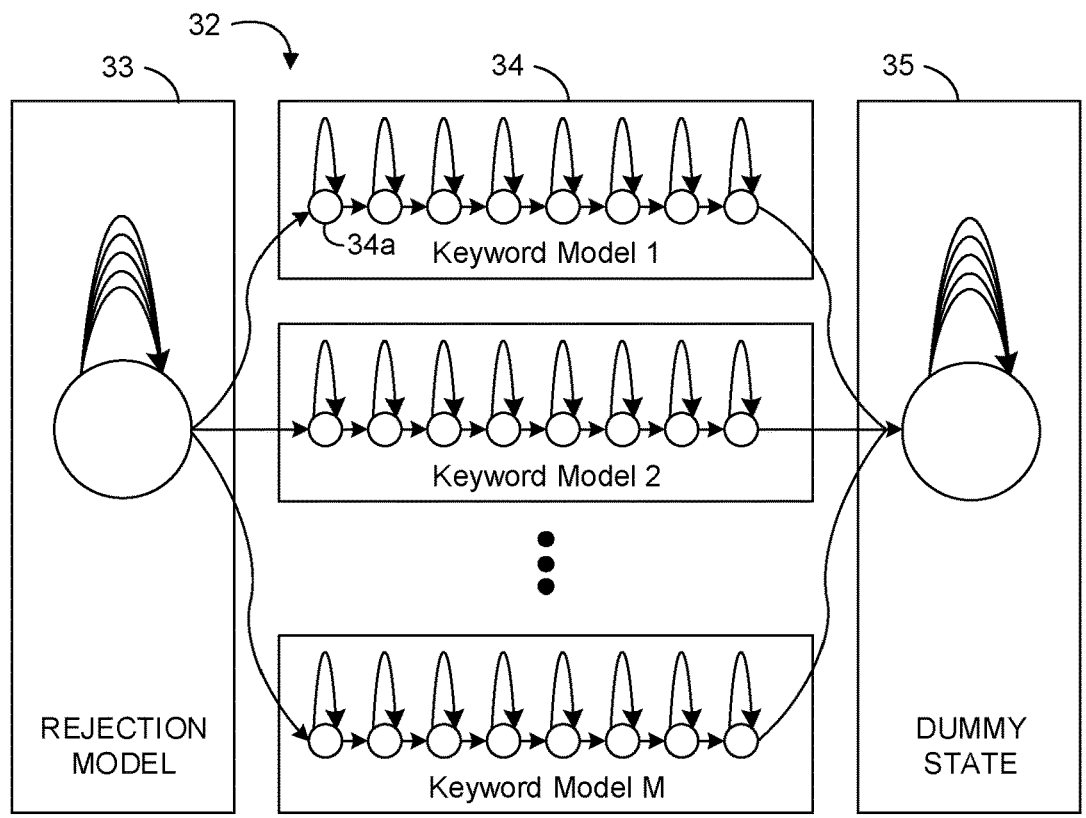
FIG. 3 is an illustrative diagram of an example of a multi-keyword model according to an embodiment.

Turning now to FIG. 3, an embodiment of a multi-keyword model 32 may include a rejection model 33, a plurality of keyword models 34 (e.g., keyword model 1 through keyword model M; M>1), and a dummy state 35. The rejection model 33 is logically positioned before the keyword models 34 and handles silence, noises, and non-keyword speech. The keyword models 34 each include one or more sub-phonetic units 34a (e.g., tri-phone states). Although each example keyword model 1 through M is illustrated with eight sub-phonetic states 34a, more or fewer such states may be utilized depending on the keyword. For the phrase INTEL, for example, the phoneme sequence would be IH2 N T EH1 L in ARPABET lexicon notation, the tri-phone sequence would then be eps/IH2/N IH2/N/T N/T/EH1 T/EH1/L EH1/L/eps. Each arch in FIG. 3 may correspond to an output of a time-delay neural network (e.g., a sub-phonetic output).

For a sequence length of N (number of states; N>0), $S_0 \ldots S_{N-1}$ may denote states scores. An initial hidden Markov model (HMM) state 0 models the rejection (e.g., state 0 models everything that does not belong to a keyword). The HMM states 1 . . . N−1 form the keyword model. The final score of the keyword model is calculated as $S_{N-1}$ . . . $S_0$ and expresses the log likelihood that the keyword was spoken. In order to model endpointing, some embodiments add an N-th dummy state 35 for each of the keyword models 34. The dummy state 35 models arbitrary speech, noise, and/or silence after the keyword. With the dummy state 35, some embodiments may precisely estimate (e.g., with an average error of 50 ms) the time-stamp of when the keyword ends.

For a multi-stage wakeup system (e.g., including a keyword listening model, a classification system model, and a full ASR system), some embodiments may model an utterance/intent by two or more keywords with optional silence in between. With suitable keyword recognition and segmentation tools, some embodiments advantageously utilize keywords on both speech and text to perform an intent recognition task. If the recognized intent so indicates, the triggered larger system (e.g., the full ASR system) may then use its higher power consumption and more complicated ASR engine and text model for further processing.

For the keyword listening model, the system keeps listening to the keywords and triggers the larger system once the current keyword sequence indicates the utterance intent with high confidence (e.g., a confidence or intent recognition score exceeds a threshold score). Otherwise the first stage listening returns to a sleep state and waits for the next stage (keyword) to be detected based on the phone sequence until the end of the utterance.

For the classification system model, the system process takes the output of the keyword detection module and the detection of an 'end of utterance' to determine an intent classification. The intent classification model may utilize three features including phones, words, and acoustic spectrograms. With suitable keyword recognition and segmentation tools, the intent recognition task may include 1) Self looping if the keyword is un-detected; 2) Segmenting the keyword and passing the results to an input of an intent classification module, if a keyword/sequence is detected; 3) Sending a make decision signal, if an end of utterance detected; and 4) Making the intent classification decision and outputting the same.

Figure 4:
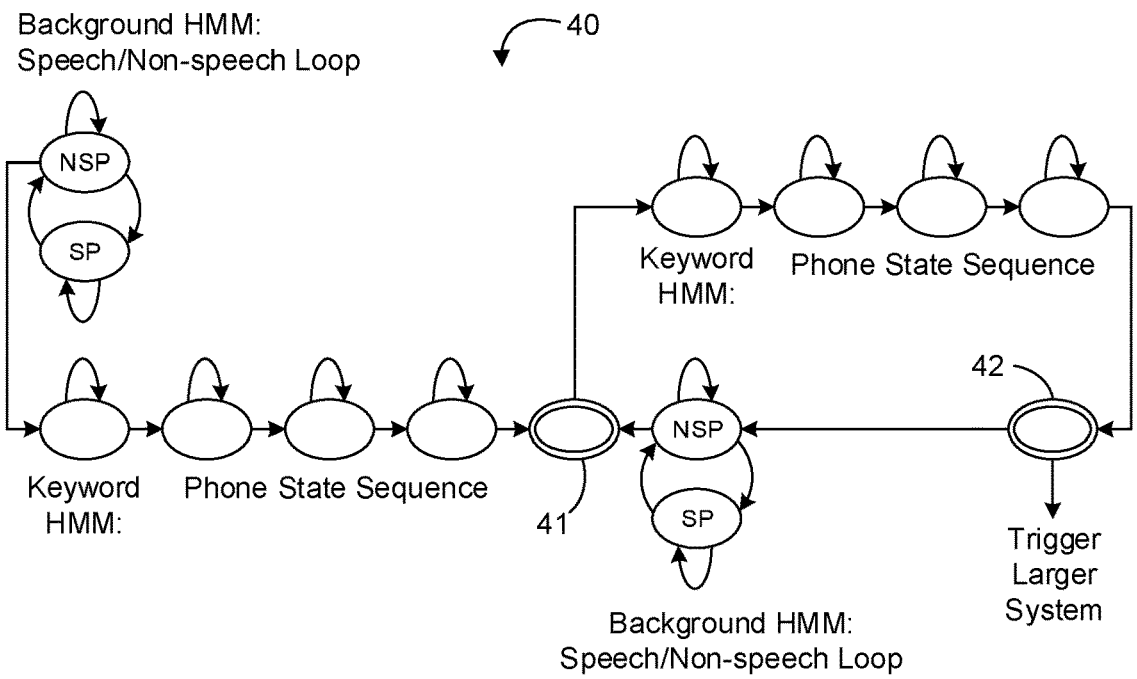
FIG. 4 is a state diagram of an example of a process for keyword detection according to an embodiment.

With reference to FIG. 4, an embodiment of a keyword listening model 40 may be represented as a series of states. The model 40 may start in a background HMM state which loops between speech and non-speech. When a keyword HMM is detected, the model 40 may go to a phone state sequence to detect a keyword. At state 41, a decision may be made whether the keyword is relevant to any recognized intent. If not, the model 40 may go to the background HMM speech/non-speech loop state. If so, the model 40 may wait to detect another keyword HMM followed by a phone state sequence (e.g., although three sub-phonetic units are illustrated, there may be more or fewer in each phone state sequence depending on the keyword). After the next keyword is detected, the model 40 may go to state 42 to make a decision to either trigger the larger system (e.g., if the intent is recognized based on the sequence of detected keywords, and full ASR may proceed) or to return to the background HMM speech/non-speech loop state to wait for more keywords.

Figure 5:
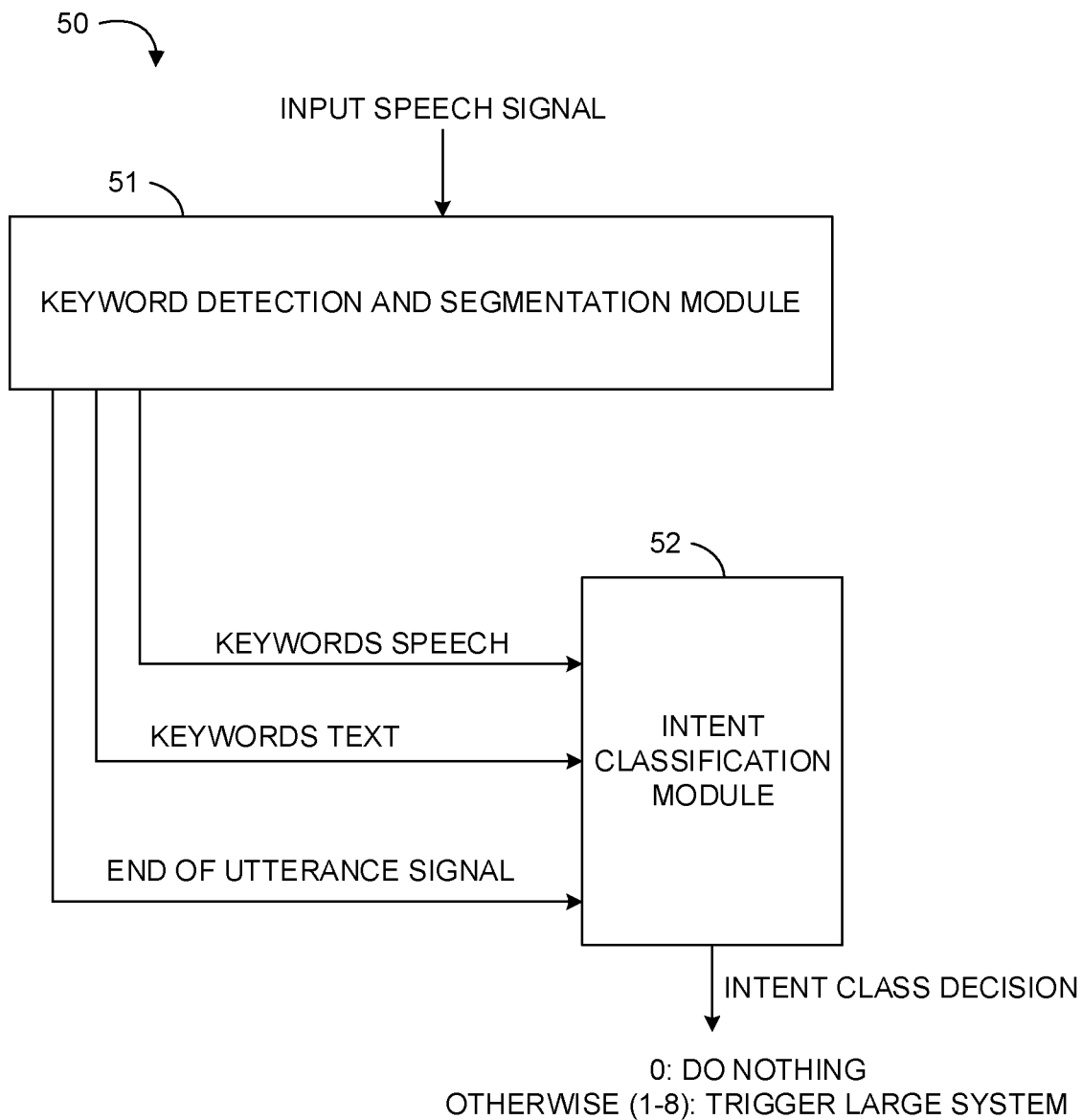
FIG. 5 is a block diagram of an example of a wake on intent speech processing system according to an embodiment.

With reference to FIG. 5, an embodiment of a wake on intent apparatus 50 includes a keyword detection and segmentation module 51 communicatively coupled to an intent classification module 52. The module 51 receives an input speech signal and output a keywords speech signal, a keywords text signal, and end of utterance signal. The module 52 receives the signals from the module 51 and outputs an intent class decision. For example, the intent class decision may include a four (4) bit binary digital signal where a value of zero (0) indicates 'DO NOTHING' (e.g., corresponding to no intent recognition) while non-zero indicates "TRIGGER LARGE SYSTEM" (e.g., corresponding to a recognized intent to have the input speech signal further processed by the full ASR system). For example, the module 52 may include a neural network or other machine learning network trained with an intent classification model.

For example, the apparatus 50 may implement one or more aspects of the method 20 (FIGS. 2A to 2C), the method 60 (FIG. 6), or any of the embodiments discussed herein. In some embodiments, the illustrated apparatus 50 may include be implemented as discrete components on a printed circuit board (PCB) substrate, or digital circuitry on one or more semiconductor substrate(s) (e.g., silicon, sapphire, gallium arsenide, a SoC, etc.) with suitable logic (e.g., transistor array and other integrated circuit components) coupled to the substrate(s). The logic of the apparatus 50 may be implemented at least partly in configurable logic or fixed-functionality logic hardware. In one example, the logic may include transistor channel regions that are positioned (e.g., embedded) within the substrate(s). Thus, the interface between the logic and the substrate(s) may not be an abrupt junction. The logic may also be considered to include an epitaxial layer that is grown on an initial wafer of the substrate(s).

Figure 6:
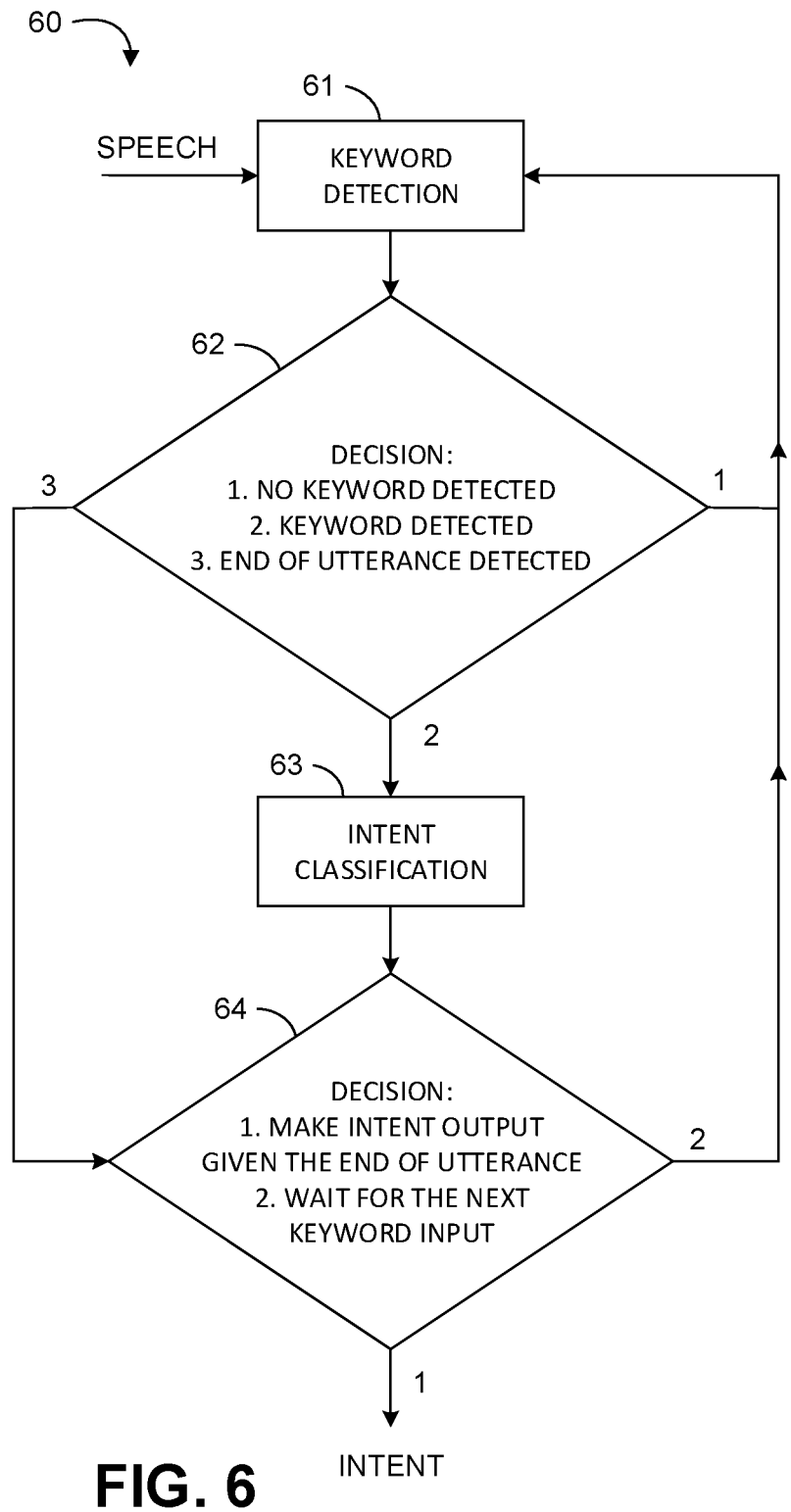
FIG. 6 is a block diagram of an example of another method of waking on intent according to an embodiment.

With reference to FIG. 6, an embodiment of a method 60 of waking on intent may include performing keyword detection on a speech signal at block 61, and determining whether a keyword or an end of utterance is detected at block 62. If no keyword is detected at block 62, the method 60 may loop back to block 61. If a keyword is detected at block 62, the method 60 may proceed to performing intent classification at block 63 and then determining whether to output an intent or wait for the next keyword at block 64. If an end of utterance is detected at block 62, the method 60 may proceed directly to block 64 without further intent classification. At block 64, the method 60 may output an intent based on either the end of utterance being detected at block 62 or the intent classification from block 63. For example, if an intent is recognized with sufficient confidence at block 63, the method 60 may output that intent without waiting for another keyword or an end of utterance. If the end of utterance is indicated, the method 60 may output the most likely intent from block 63 (if more than one intent is recognized) or may output an indication of no intent if no intent is recognized with sufficient confidence. Otherwise, the method 60 may loop back to block 61 to wait for the next keyword input.

Feature and Model Variation Examples

In some embodiments, the features to represent the keywords which occurred in an utterance may fall into 3 categories including MFCC sequences, phone sequences in distinctive feature vector representations for each phoneme (e.g., see PHOIBLE at https://phoible.org, and word level GLOVE vectors sequence (e.g., see https://nlp.stanford.edu/projects/glove/). Some embodiments may have the keyword set defined for each intent in specific domains. After the keyword detection system detects and segments the keywords from the utterances, some embodiments may then convert the speech words to the corresponding MFCC feature vector sequence, phone level sequence and the word level vectors that represent the detected keyword sequence. In some embodiments, LSTM is used as the model for learning and classification of nine (9) intent classes (e.g., as discussed in more detail below). Each input feature stream is passed to one individual LSTM model for intent classification, and the fusion of the three systems will give the final intent results. An embodiment of an individual LSTM system is described below in connection with FIG. 8. An embodiment of the fusion of the systems with a decision threshold is described below in connection with FIG. 7. A bagging mechanism is used for obtaining the maximum softmax output score based final decision of the classes. The input scale is a full utterance's keywords list. An example model details are shown in the following list. With a dropout probability of 0.5, the total training time takes about 2.4 hours.

Number of Time Steps for Input Feature:

30 timesteps for MFCC
20 timesteps for Phones
15 timesteps for words

Figure 7:
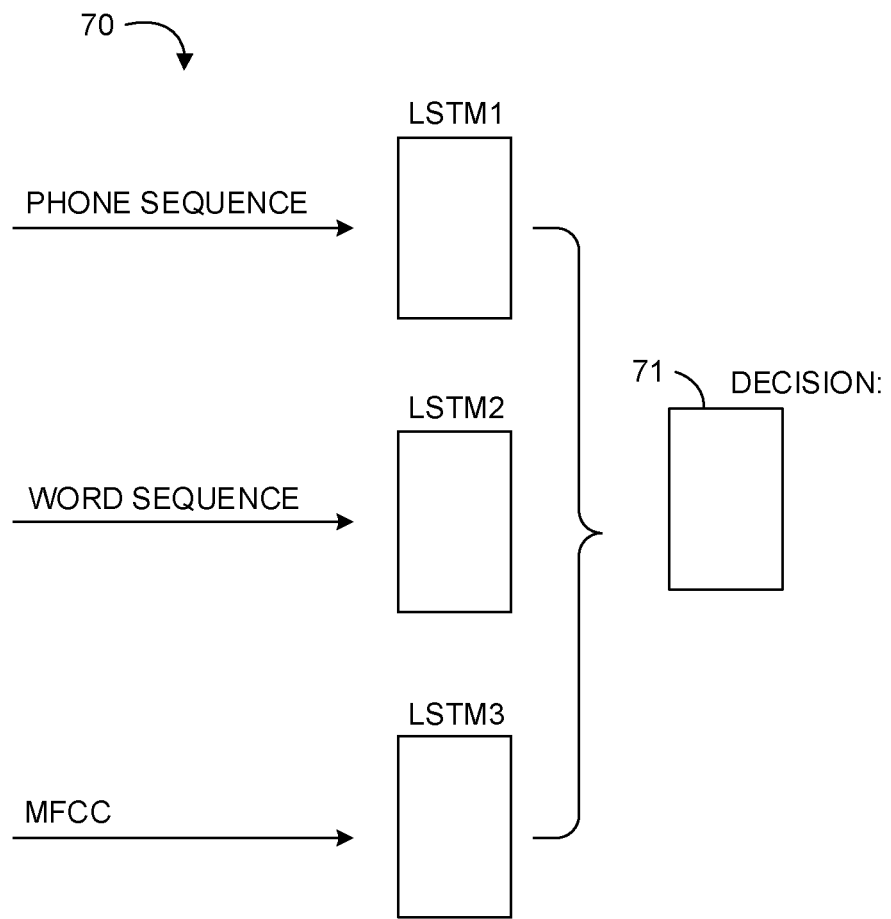
FIG. 7 is an illustrative diagram of an example of a classification system according to an embodiment.

With reference to FIG. 7, an embodiment of a classification system 70 may include three LSTMs (LSTM1, LSTM2, and LSTM3) each of which receive a different input feature stream. For example, a phone sequence may be provided to LSTM1, a word sequence may be provided to LSTM2, and an MFCC stream may be provided to LSTM3. A final decision network 71 may receive the results from each of the LSTMs to output a final decision. For example, the decision network 71 may pick the class label with the maximum average softmax output score (0-1) over the three LSTMs.

Figure 8:
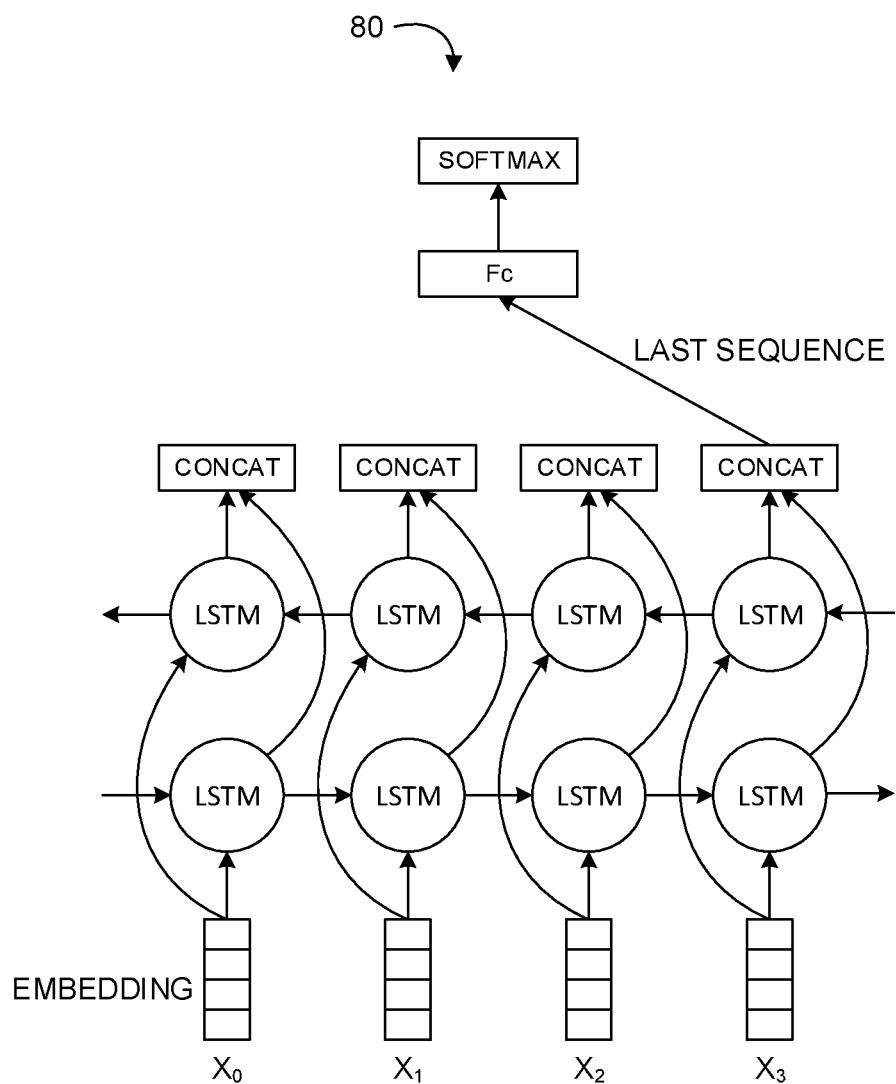
FIG. 8 is an illustrative diagram of an example of an individual Long Short-Term Memory (LSTM) structure according to an embodiment.

With reference to FIG. 8, an embodiment of an individual LSTM model structure 80 may be configured as follows:

learning_rate = 0.001
Number of hidden layers = 5
Units per hidden layer = 20
Number of classes = 9 # output vector For the speech data, in one example, a keyword dataset is expanded from an AMIE domain to a KIDS SPACE domain main. Dialog State Tracking Challenge (DSTC) 5 (http://workshop.colips.org/dstc5/tasks.html) is the text corpus on intent/dialog state tracking in conversations. The example dialog states are recommendation, explanation, acknowledgement, etc. The utterances and corresponding state labels are selected and used to expand the corpus. For an example KIDS SPACE dataset, the beginning and testing self-introduction dialog part has 15 examples for each of the 6-7 intents.

SPEECH2VEC is another form of word level vector representation which takes the word level speech segment and converts it to an N-domain vector representation (e.g., usually N=100 or 200). The training may take place on standard Librispeech data with a seq2seq autoencoder model. This provides an additional word level feature (e.g., the 4th feature) for the current intent classification system that fuses the three LSTM model based input streams (WORD2VEC, phones, and acoustic features).

Utterance-level intent recognition in the dialogue context may be transferred to the new domain of KIDS SPACE from the smart cabin (e.g., AMIE domain) and the features include both speech and text. Even with the pure text based conversations and dialogs, some embodiments may use SPEECH2VEC, WORD2VEC and phone sequences as the input features for the dialog state classification. For the case of AMIE and KIDS SPACE data, SPEECH2VEC is used as an additional word level feature that assumes that the words are pronounced and recorded in standard clean English way.

An embodiment of wake on intent technology as described herein was tested in an application domain of in-car environment (e.g., a smart cabin). The AMIE dataset included videos recorded for a smart cabin in-car environment where a virtual agent is talking to and receiving instructions from the passengers to take actions in the car. A machine learning neural network was trained with over 1000 1207 word-intent-labelled utterances and over 300 distinct keywords-to-utterance-intent cases with about 150 distinct keywords and 9 intent classes. In addition to this dataset, various online available keywords dataset (e.g., such as GOOGLE COMMANDS) may be utilized. Text-to-speech tools may also be utilized to generate the instances of some keywords for training.

The KALDI-based GENTLE tool was used with its own DNN acoustic model to perform forced alignment for keyword segmentation and speech extraction from the utterances using both the manual transcripts and speech audios with about 90% keyword time segmentation accuracy. There are some words that were used for different intent classes but each utterance is only labeled with one intent. With respect to classification accuracy for different input features including: 1) Forced aligned MFCC LSTM; 2) Forced aligned phone sequence LSTM; and 3) manual keyword transcript based GLOVE LSTM, embodiments of an utterance-level intent classification from keywords showed at least twenty percent better performance as compared to word-level intent classification from keywords. The fusion of the LSTM systems (phone+MFCC+manual GLOVE) further improves the intent detection performance with the bagging decision mechanism as compared with the individual feature input systems.

Some embodiments may provide keyword model transfer technology with the words, phones and acoustics as the input features. An expanded domain dataset may include added forced alarms and forced rejection noisy words data and the collected conversational text/speech data in the smart cabin and KIDS SPACE domains. Comparing example results for both individual keyword detection and combined multiple keyword detection and listening performance, for utterances with or without corresponding intents, F1 scores for the intent recognition using the a classification model on utterance level embodiments shows better accuracy as compared to individual word level for each of a single domain, an expanded domain, and two domains. For example, the single domain is mainly in a smart cabin, the expanded domain includes the added forced alarm and forced rejection noisy words data, and the two domains are the smart cabin and KIDS SPACE. Additional domain expansion may further improve the F1 scores.

For an example including four features, namely, 1: acoustics, 2: phones, 3: WORD2VEC, 4: SPEECH2VEC, each feature is passed to an LSTM based intent classification system and the final decision is made by bagging mechanism of the decision fusion from the individual systems. The testing dataset is a combination of the keywords-based utterances from three different domains. Comparing results for different combinations of features (e.g., 1, 2, 3; 2, 3, 4; 1, 2, 4; 1, 3, 4; and 1, 2, 3, 4), shows better accuracy for embodiments of utterance-level intent classification as compared to word-level intent classification. In some embodiments, the weights may be updated for each feature as determined by the relative effect of the individual features, which may further improve the performance of a four feature embodiment.

Some embodiments advantageously utilize an intent classification model from recognized keywords. In a low power application, using a keyword sequence in an utterance is advantageously sufficient and beneficial for utterance level intent recognition. Some embodiments further utilize speech acoustic features together with text input to further improve the intent detection accuracy (e.g., as compared to text only). Embodiments of the described intent recognition framework from detected keywords sets may advantageously be extended in different domains, and may be particularly useful for low-power, always-on applications.

Figure 9:
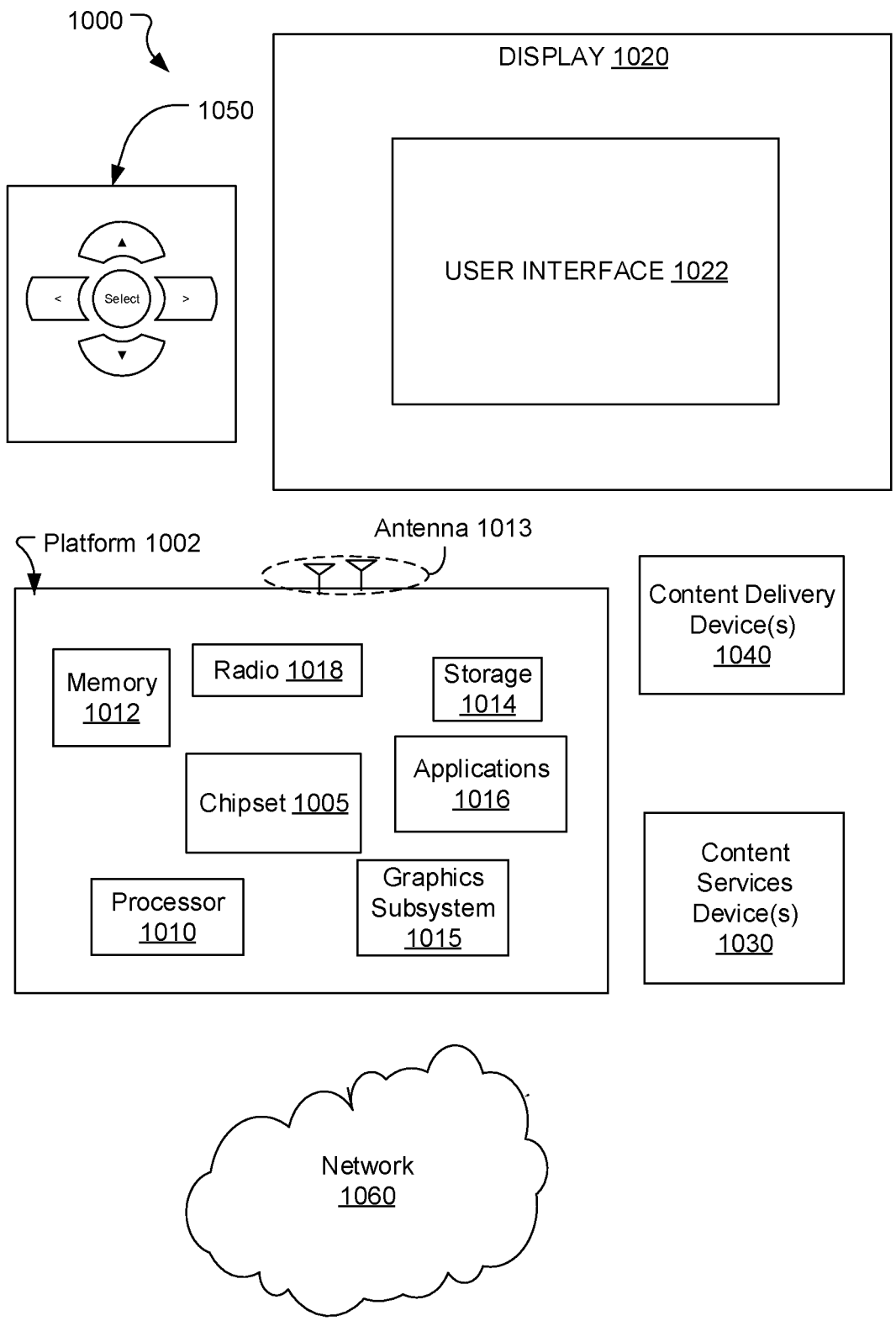
FIG. 9 is an illustrative diagram of an example system.

FIG. 9 is an illustrative diagram of an example system 1000, arranged in accordance with at least some implementations of the present disclosure. In various implementations, system 1000 may be a mobile system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
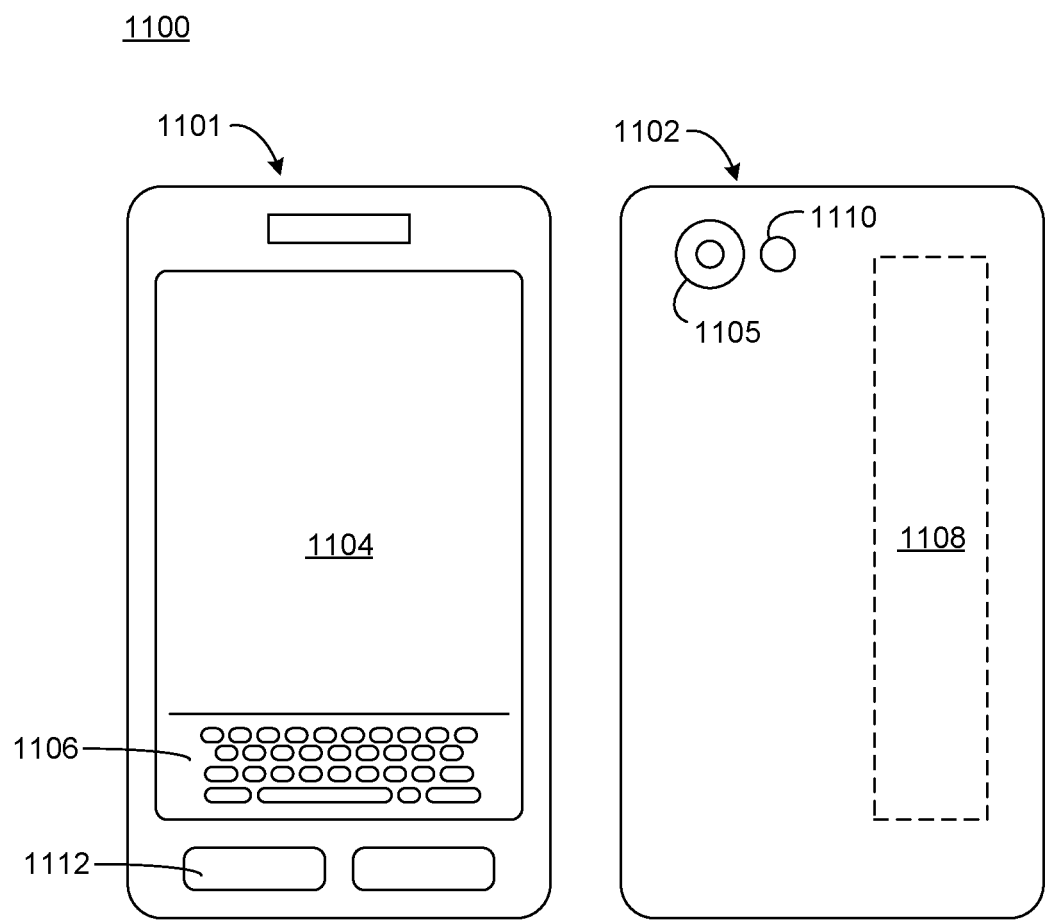
FIG. 10 illustrates an example small form factor device, all arranged in accordance with at least some implementations of the present disclosure.

As described above, system 1000 may be embodied in varying physical styles or form factors. FIG. 10 illustrates an example small form factor device 1100, arranged in accordance with at least some implementations of the present disclosure. In some examples, system 1000 may be implemented via device 1100. In other examples, system 100 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

The system 1000 and/or the device 1100 may include one or more features or aspects of the various embodiments described herein, including those described in the following examples.

Additional Notes and Examples

Example 1 includes an electronic system, comprising memory to store a digital representation of a spoken natural language utterance, a processor coupled to the memory, and logic coupled to the processor and the memory, the logic to detect one or more keywords in the stored representation of the spoken natural language utterance, determine an intent of the spoken natural language utterance based on the detected keywords, and provide the spoken natural language utterance to a speech recognition and interpretation system if the determined intent is to further process the spoken natural language utterance.

Example 2 includes the system of Example 1, wherein the logic is further to determine the intent based on a sequence of detected non-keyphrase keywords in the spoken natural language utterance.

Example 3 includes the system of Example 2, wherein the logic is further to trigger the speech recognition and interpretation system prior to identification of an end of the spoken natural language utterance based on the sequence of detected non-keyphrase keywords.

Example 4 includes the system of any of Examples 1 to 3, wherein the logic is further to classify the intent into one of three or more intent classifications based on detected keywords which are relevant to the intent.

Example 5 includes the system of Example 4, further comprising a neural network trained with an intent classification model communicatively coupled to the logic to classify the intent based on keyword speech information, keyword text information, and end of utterance information.

Example 6 includes the system of Example 5, wherein the keyword speech information includes one or more of phoneme information and acoustic spectrogram information.

Example 7 includes the system of any of Examples 1 to 6, wherein the logic is further to segment a detected keyword sequence from the spoken natural language utterance, and convert speech words from the segmented keywords to a corresponding MFCC feature vector sequence, a phoneme level sequence, and word level vectors that represent the detected keyword sequence.

Example 8 includes a method of waking on intent, comprising detecting one or more keywords in a digital representation of a spoken natural language utterance, determining an intent of the spoken natural language utterance based on the detected keywords, and providing the spoken natural language utterance to a speech recognition and interpretation system if the determined intent is to further process the spoken natural language utterance.

Example 9 includes the method of Example 8, further comprising determining the intent based on a sequence of detected non-keyphrase keywords in the spoken natural language utterance.

Example 10 includes the method of Example 9, further comprising triggering the speech recognition and interpretation system prior to identification of an end of the spoken natural language utterance based on the sequence of detected non-keyphrase keywords.

Example 11 includes the method of any of Examples 8 to 10, further comprising classifying the intent into one of three or more intent classifications based on detected keywords which are relevant to the intent.

Example 12 includes the method of Example 11, further comprising providing keyword speech information, keyword text information, and end of utterance information to a neural network trained with an intent classification model to classify the intent.

Example 13 includes the method of Example 12, wherein the keyword speech information includes one or more of phoneme information and acoustic spectrogram information.

Example 14 includes the method of any of Examples 8 to 13, further comprising segmenting a detected keyword sequence from the spoken natural language utterance, and converting speech words from the segmented keywords to a corresponding MFCC feature vector sequence, a phoneme level sequence, and word level vectors that represent the detected keyword sequence.

Example 15 includes at least one machine readable medium comprising a plurality of instructions that, in response to being executed on a computing device, cause the computing device to detect one or more keywords in a digital representation of a spoken natural language utterance, determine an intent of the spoken natural language utterance based on the detected keywords, and provide the spoken natural language utterance to a speech recognition and interpretation system if the determined intent is to further process the spoken natural language utterance.

Example 16 includes the machine readable medium of Example 15, comprising a plurality of further instructions that, in response to being executed on the computing device, cause the computing device to determine the intent based on a sequence of detected non-keyphrase keywords in the spoken natural language utterance.

Example 17 includes the machine readable medium of Example 16, comprising a plurality of further instructions that, in response to being executed on the computing device, cause the computing device to trigger the speech recognition and interpretation system prior to identification of an end of the spoken natural language utterance based on the sequence of detected non-keyphrase keywords.

Example 18 includes the machine readable medium of any of Examples 15 to 17, comprising a plurality of further instructions that, in response to being executed on the computing device, cause the computing device to classify the intent into one of three or more intent classifications based on detected keywords which are relevant to the intent.

Example 19 includes the machine readable medium of Example 18, comprising a plurality of further instructions that, in response to being executed on the computing device, cause the computing device to provide keyword speech information, keyword text information, and end of utterance information to a neural network trained with an intent classification model to classify the intent.

Example 20 includes the machine readable medium of Example 19, wherein the keyword speech information includes one or more of phoneme information and acoustic spectrogram information.

Example 21 includes the machine readable medium of any of Examples 15 to 20, comprising a plurality of further instructions that, in response to being executed on the computing device, cause the computing device to segment a detected keyword sequence from the spoken natural language utterance, and convert speech words from the segmented keywords to a corresponding MFCC feature vector sequence, a phoneme level sequence, and word level vectors that represent the detected keyword sequence.

Example 22 includes a semiconductor apparatus, comprising a substrate, and logic coupled to the substrate, the logic to detect one or more keywords in the stored representation of the spoken natural language utterance, determine an intent of the spoken natural language utterance based on the detected keywords, and provide the spoken natural language utterance to a speech recognition and interpretation system if the determined intent is to further process the spoken natural language utterance.

Example 23 includes the apparatus of Example 22, wherein the logic is further to determine the intent based on a sequence of detected non-keyphrase keywords in the spoken natural language utterance.

Example 24 includes the apparatus of Example 23, wherein the logic is further to trigger the speech recognition and interpretation system prior to identification of an end of the spoken natural language utterance based on the sequence of detected non-keyphrase keywords.

Example 25 includes the apparatus of any of Examples 22 to 24, wherein the logic is further to classify the intent into one of three or more intent classifications based on detected keywords which are relevant to the intent.

Example 26 includes the apparatus of Example 25, further comprising a neural network trained with an intent classification model communicatively coupled to the logic to classify the intent based on keyword speech information, keyword text information, and end of utterance information.

Example 27 includes the apparatus of Example 26, wherein the keyword speech information includes one or more of phoneme information and acoustic spectrogram information.

Example 28 includes the apparatus of any of Examples 22 to 27, wherein the logic is further to segment a detected keyword sequence from the spoken natural language utterance, and convert speech words from the segmented keywords to a corresponding MFCC feature vector sequence, a phoneme level sequence, and word level vectors that represent the detected keyword sequence.

Example 29 includes a wake on intent apparatus, comprising means for detecting one or more keywords in a digital representation of a spoken natural language utterance, means for determining an intent of the spoken natural language utterance based on the detected keywords, and means for providing the spoken natural language utterance to a speech recognition and interpretation system if the determined intent is to further process the spoken natural language utterance.

Example 30 includes the apparatus of Example 29, further comprising means for determining the intent based on a sequence of detected non-keyphrase keywords in the spoken natural language utterance.

Example 31 includes the apparatus of Example 30, further comprising means for triggering the speech recognition and interpretation system prior to identification of an end of the spoken natural language utterance based on the sequence of detected non-keyphrase keywords.

Example 32 includes the apparatus of any of Examples 29 to 31, further comprising means for classifying the intent into one of three or more intent classifications based on detected keywords which are relevant to the intent.

Example 33 includes the apparatus of Example 32, further comprising means for providing keyword speech information, keyword text information, and end of utterance information to a neural network trained with an intent classification model to classify the intent.

Example 34 includes the apparatus of Example 33, wherein the keyword speech information includes one or more of phoneme information and acoustic spectrogram information.

Example 35 includes the apparatus of any of Examples 29 to 34, further comprising means for segmenting a detected keyword sequence from the spoken natural language utterance, and means for converting speech words from the segmented keywords to a corresponding MFCC feature vector sequence, a phoneme level sequence, and word level vectors that represent the detected keyword sequence.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic system, comprising:
    memory to store a digital representation of a spoken natural language utterance;
    a processor coupled to the memory; and
    logic coupled to the processor and the memory, the logic to:
        detect one or more keywords in the stored representation of the spoken natural language utterance,
        determine an intent of the spoken natural language utterance based on a sequence of detected non-keyphrase keywords in the spoken natural language utterance,
        provide the spoken natural language utterance to a speech recognition and interpretation system if the determined intent is to further process the spoken natural language utterance, and
        trigger the speech recognition and interpretation system prior to identification of an end of the spoken natural language utterance based on the sequence of detected non-keyphrase keywords.

2. The system of claim 1, wherein the logic is further to:
    classify the intent into one of three or more intent classifications based on detected keywords which are relevant to the intent.

3. The system of claim 2, further comprising:
    a neural network trained with an intent classification model communicatively coupled to the logic to classify the intent based on keyword speech information, keyword text information, and end of utterance information.

4. The system of claim 3, wherein the keyword speech information includes one or more of phoneme information and acoustic spectrogram information.

5. The system of claim 1, wherein the logic is further to:
    segment a detected keyword sequence from the spoken natural language utterance; and
    convert speech words from the segmented keywords to a corresponding Mel-Scale Frequency Cepstral Coefficients feature vector sequence, a phoneme level sequence, and word level vectors that represent the detected keyword sequence.

6. A method of waking on intent, comprising:
detecting one or more keywords in a digital representation of a spoken natural language utterance;
determining an intent of the spoken natural language utterance based on a sequence of detected non-keyphrase keywords in the spoken natural language utterance;
providing the spoken natural language utterance to a speech recognition and interpretation system if the determined intent is to further process the spoken natural language utterance; and
triggering the speech recognition and interpretation system prior to identification of an end of the spoken natural language utterance based on the sequence of detected non-keyphrase keywords.

7. The method of claim 6, further comprising:
classifying the intent into one of three or more intent classifications based on detected keywords which are relevant to the intent.

8. The method of claim 7, further comprising:
providing keyword speech information, keyword text information, and end of utterance information to a neural network trained with an intent classification model to classify the intent.

9. The method of claim 8, wherein the keyword speech information includes one or more of phoneme information and acoustic spectrogram information.

10. The method of claim 6, further comprising:
segmenting a detected keyword sequence from the spoken natural language utterance; and
converting speech words from the segmented keywords to a corresponding Mel-Scale Frequency Cepstral Coefficients feature vector sequence, a phoneme level sequence, and word level vectors that represent the detected keyword sequence.

11. At least one non-transitory machine readable medium comprising a plurality of instructions that, in response to being executed on a computing device, cause the computing device to:
detect one or more keywords in a digital representation of a spoken natural language utterance;
determine an intent of the spoken natural language utterance based on a sequence of detected non-keyphrase keywords in the spoken natural language utterance;
provide the spoken natural language utterance to a speech recognition and interpretation system if the determined intent is to further process the spoken natural language utterance; and
trigger the speech recognition and interpretation system prior to identification of an end of the spoken natural language utterance based on the sequence of detected non-keyphrase keywords.

12. The at least one non-transitory machine readable medium of claim 11, comprising a plurality of further instructions that, in response to being executed on the computing device, cause the computing device to:
classify the intent into one of three or more intent classifications based on detected keywords which are relevant to the intent.

13. The at least one non-transitory machine readable medium of claim 12, comprising a plurality of further instructions that, in response to being executed on the computing device, cause the computing device to:
provide keyword speech information, keyword text information, and end of utterance information to a neural network trained with an intent classification model to classify the intent.

14. The at least one non-transitory machine readable medium of claim 13, wherein the keyword speech information includes one or more of phoneme information and acoustic spectrogram information.

15. The at least one non-transitory machine readable medium of claim 11, comprising a plurality of further instructions that, in response to being executed on the computing device, cause the computing device to:
segment a detected keyword sequence from the spoken natural language utterance; and
convert speech words from the segmented keywords to a corresponding Mel-Scale Frequency Cepstral Coefficients feature vector sequence, a phoneme level sequence, and word level vectors that represent the detected keyword sequence.

* * * * *